United States Patent [19]

Bachmann et al.

[11] Patent Number: 4,508,494

[45] Date of Patent: Apr. 2, 1985

[54] TWO STAGE ROTARY VANE PUMP

[75] Inventors: Erich Bachmann, Asslar; Ludwig Fabel, Wetzlar; Roland Fischer, Wetzlar; Werner Peter, Wetzlar; Bernd Scheiter, Vollnkirchen; Werner Wenzel, Schöffengrund, all of Fed. Rep. of Germany

[73] Assignee: Arthur Pfeiffer Vakuumtechnik Wetzlar GmbH, Asslar, Fed. Rep. of Germany

[21] Appl. No.: 426,201

[22] Filed: Sep. 28, 1982

[30] Foreign Application Priority Data

Oct. 2, 1981 [DE] Fed. Rep. of Germany ....... 3139232

[51] Int. Cl.³ ............................................. F04C 23/00
[52] U.S. Cl. ...................................... 418/13; 418/212
[58] Field of Search ................. 418/13, 210, 212, 213; 464/103

[56] References Cited

U.S. PATENT DOCUMENTS 1,244,533 10/1917 Morse ................................. 464/103

FOREIGN PATENT DOCUMENTS 772944 4/1957 United Kingdom .................. 418/13

Primary Examiner—William R. Cline
Assistant Examiner—John J. McGlew, Jr.
Attorney, Agent, or Firm—Toren, McGeady and Stanger

[57] ABSTRACT

An arrangement for transmitting torque between the two rotors of a two stage rotary vane pump, consists of a coupling element, which forms between engagements on opposing faces of the two rotors, a connection which permits two degrees of freedom between the two rotors in the plane perpendicular to the rotor axis.

2 Claims, 8 Drawing Figures

TWO STAGE ROTARY VANE PUMP

BACKGROUND OF THE INVENTION

The invention concerns an arrangement for transmitting the torque between the two rotors of a two-stage rotary vane pump.

In two-stage rotary vane pumps, for reasons of cost the high vacuum stage is arranged coaxially with the atmospheric stage. The rotor of the atmospheric stage, driven by an electric motor, transfers the necessary torque to the rotor of the high vacuum stage. For the purposes of the coupling arrangement according to the invention, however, the two rotors may be interchanged.

It is known from the prior art that the rotors could be arranged on a single shaft without a coupling. In this case, however, vane slits extending radially right through the rotor are not possible, so that the diameter of the rotors must be made substantially larger, and this disadvantageously affects the friction losses and the size of the whole pump.

Moreover, rotors for these purposes are known which are not arranged on a single shaft, but are provided with individual bearings. In this case, the rotors have on their opposed faces grooves and bars which inter-engage to form a coupling.

This form of coupling has only one radial degree of freedom, parallel to the groove and bar. Since neither the groove nor the bar can be made absolutely symmetrical relative to the axis, the bearing pins are radially displaced by the sum of the two errors. Due to the oscillating mechanical displacement of the two bearing pins, satisfactory hydrodynamic support of the rotors is not possible. Moreover, since an effective lubrication film cannot form, damage to the bearings results. Enlargement of the play between the groove and bar does not solve the problem, since in transmitting the torque, the bar and groove engage one another diagonally, and the play provided disappears. The displacement of the bearing pins remains. Further, this solution runs counter to the requirement for noise reduction.

Commercially available couplings can be used for connecting the two rotor parts, and these at least partly reduce the above-mentioned problems and their resulting damage. These, however, use up a relatively large space and thus disadvantageously increase the size of the whole pump.

SUMMARY OF THE INVENTION

It is the object of the invention to achieve transmission of rotation from a first to a second rotor by means which are small in size and cheap, such that the above disadvantages, for example radial displacement of the bearing pins, due to inaccuracies of production and radial components of force, are avoided.

Accordingly, the invention proposes a two-stage rotary vane pump, having a first rotor of one stage and a second rotor of the other stage, and a coupling element between said first and second rotors and in driving relationship therewith said element forming between engagements on opposed faces of the two rotors a connection which permits two degrees of freedom between the two rotors in the plane perpendicular to the rotor axis.

BRIEF DESCRIPTION OF THE DRAWINGS

The arrangement according to the invention is more closely described with reference to examples thereof shown in FIGS. 1 to 8.

DESCRIPTION OF THE PREFERRED EMBODIMENTS

Figure 1:
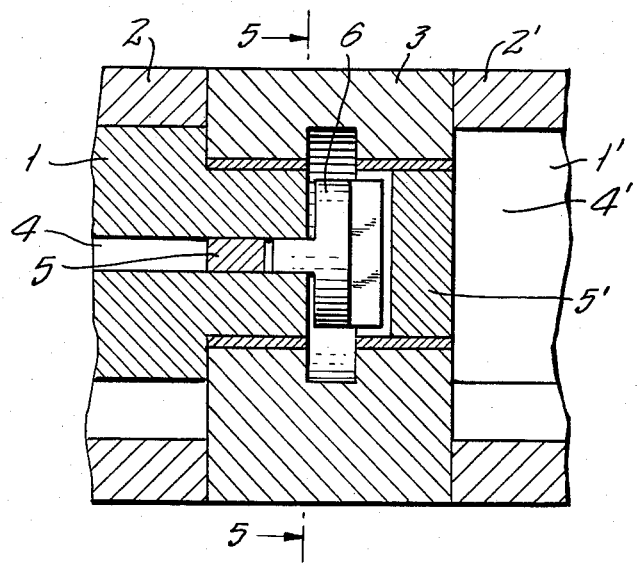
FIG. 1 shows the two rotors with a coupling element 6 as in FIG. 2.
Figure 3:
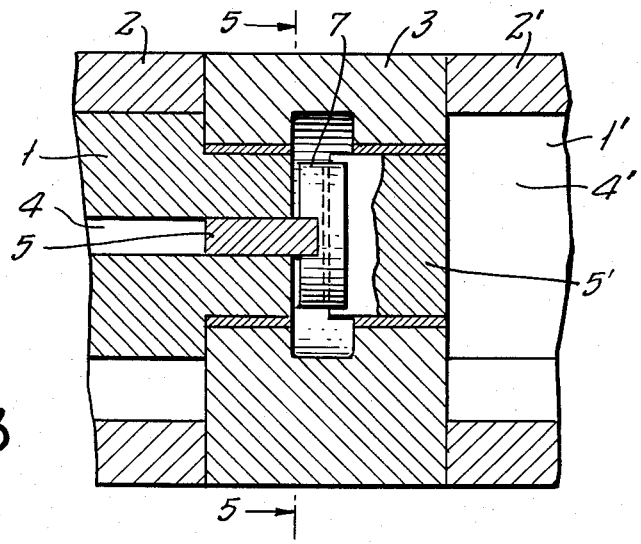
FIG. 3 shows the two rotors with a coupling element 7 according to FIG. 4.
Figure 6:
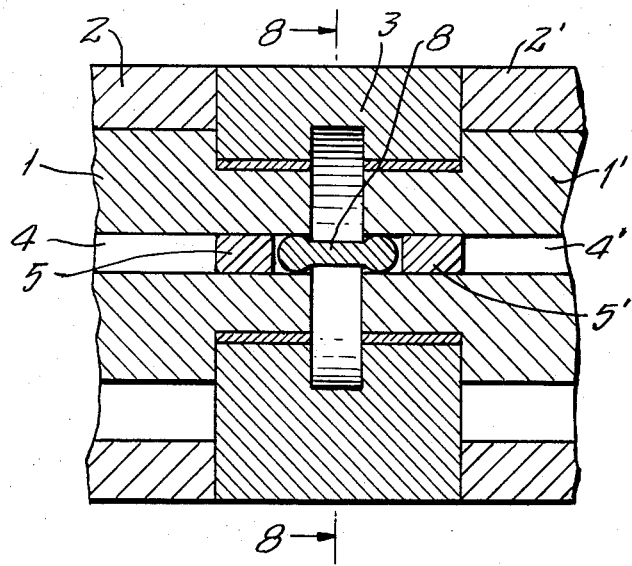
FIG. 6 shows the two rotors with a coupling element 8 according to FIG. 7.

The two rotors to be connected together are marked 1 and 1' in the successive FIGS. 1,3 and 6. The two cylinders 2 and 2' are connected together by means of the intermediate member 3, which acts as a bearing. The intermediate members 5 and 5' are shrunk into the axial rotor slits 4,4' in the region of the bearing pins. In FIGS. 1 and 6, this produces grooves when the intermediate members are short, but in FIG. 3 raised bars when the intermediate members are long.

Figure 2:
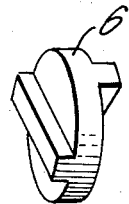
FIG. 2 shows a perspective view of the coupling element 6.
Figure 4:
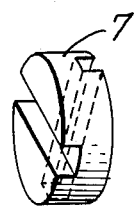
FIG. 4 shows a perspective view of the coupling element 7.
Figure 5:
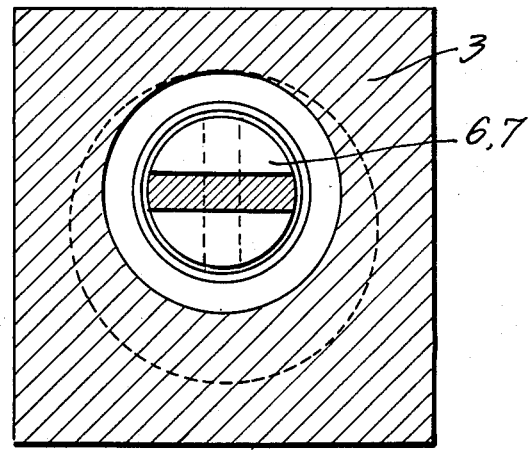
FIG. 5 shows a section 5—5 in FIG. 1 or FIG. 3.

The coupling element which transmits the torque from the one to the other rotor is designated 6 in FIG. 1, and is formed with projecting bars. This is clearly shown in FIG. 2, in which the coupling member is shown in perspective. The coupling member in FIG. 3 is marked 7 and is provided with grooves. This is clearly shown in FIG. 4. The groove/bar pairing can also be mixed.

Figure 7:
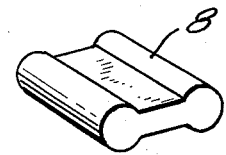
FIG. 7 shows a perspective view of the coupling element 8.
Figure 8:
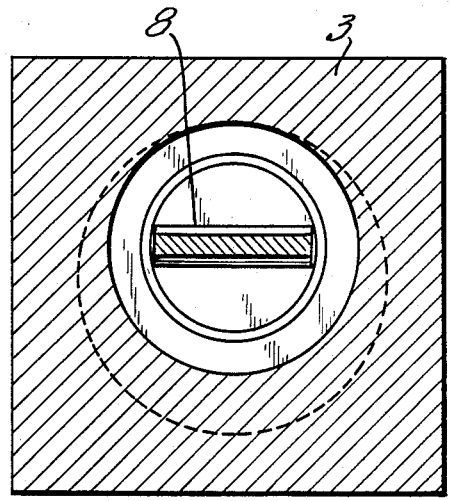
FIG. 8 shows section 8—8 in FIG. 6.

A further embodiment of the coupling member is marked 8 in FIG. 6, and is also shown in perspective in FIG. 7. In this case, one degree of freedom is given in the direction of the groove, and the second degree of freedom, perpendicular to the first, is derived from a pivoting motion.

The bars of the coupling elements can engage without play in the grooves in the opposed faces of the rotors and vice versa. The grooves or bars of the rotors require no extra cost in production, since they result from the production of the slits for the rotary vanes in the axial direction and the shrunk-in intermediate members, which can be formed shorter or longer than the bearing pins. Such coupling arrangements reduces the displacement of the bearing pins. They can transmit torques with a minimum of radial force components.

The hydrodynamic bearings of the two rotors can adjust themselves independently of one another, corresponding to the pressures of the pump stages. The space requirement is very limited, relative to that necessary for prior art arrangements. A further advantage is that the guides needed for this kind of coupling on the rotors do not need special manufacture, since the intermediate members engaged in the tube slits are shorter or longer than the bearing pins.

It will be understood that the above description of the present invention is susceptible to various modifications, changes and adaptations.

What is claimed is:

1. A rotor arrangement for use in a two-stage rotary vane pump, having a first rotor of one stage and a second rotor of the other stage, and a coupling element located between said first and second rotors and in driving relationship therewith, said element forming between engagements on opposed faces of the two rotors a connection which permits two degrees of freedom between the two rotors in the plane perpendicular to the rotor axis, a groove in a face of one of the rotors, in which the coupling element engages, is formed by the axial ends of the vane slits in said one rotor.

2. A rotor arrangement according to claim 1, wherein the coupling element has opposite sides with each side facing a different one of said rotors, and the coupling element is formed on the opposite sides with engagement bars displaced relative to one another by substantially 90°.

* * * * *